US011556726B2

(12) United States Patent
Davis

(10) Patent No.: US 11,556,726 B2
(45) Date of Patent: *Jan. 17, 2023

(54) DYNAMIC PRODUCT LABELS FOR COMPILING CUSTOM DATA FROM SUPPLY CHAIN NODES

(71) Applicant: Origin Labs, Inc., Porter Ranch, CA (US)

(72) Inventor: Danny Davis, Rancho Santa Margarita, CA (US)

(73) Assignee: Offstage Holdings, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/228,200

(22) Filed: Apr. 12, 2021

(65) Prior Publication Data

US 2021/0232780 A1   Jul. 29, 2021

Related U.S. Application Data

(63) Continuation of application No. 16/717,658, filed on Dec. 17, 2019, now Pat. No. 10,977,456.

(51) Int. Cl.
*G06K 7/10* (2006.01)
*G06K 19/07* (2006.01)

(52) U.S. Cl.
CPC ..... *G06K 7/10297* (2013.01); *G06K 19/0723* (2013.01)

(58) Field of Classification Search
CPC ............. G06K 7/00; G06K 7/08; G06K 7/081
USPC .......................... 235/451, 439, 375, 487, 435
See application file for complete search history.

(56) References Cited

U.S. PATENT DOCUMENTS

| | | | |
|---|---|---|---|
| 2006/0280149 A1* | 12/2006 | Kuhl | H04B 5/0062 340/539.23 |
| 2008/0218354 A1 | 9/2008 | Lorentz et al. | |
| 2009/0187583 A1* | 7/2009 | Pape | G06Q 50/30 |
| 2009/0198596 A1 | 8/2009 | Dolan et al. | |
| 2013/0176113 A1 | 7/2013 | Mallin | |

(Continued)

FOREIGN PATENT DOCUMENTS

| | | | | |
|---|---|---|---|---|
| AU | 2009283243 B2 * | 4/2016 | | G06Q 10/06 |
| CA | 2818052 A1 * | 9/2014 | | G06F 19/3456 |
| CN | 102622693 A * | 8/2012 | | |

(Continued)

*Primary Examiner* — Edwyn Labaze
(74) *Attorney, Agent, or Firm* — Ansari Katiraei LLP; Arman Katiraei; Sadiq Ansari

(57) ABSTRACT

Provided is a dynamic label for a product. Data that is generated at different nodes in the supply chain can be linked to a unique identifier associated with the product. At a particular node, the dynamic label may be added to the product, container, or package. The dynamic label may include a Near Field Communication ("NFC") tag with a value that can be read using a user device. The dynamic label may be connected to the unique identifier. When the product reaches a consumer, the consumer may use a device to read the dynamic label, and pass the value from the dynamic label to a host. The host may identify the connection between the dynamic label and the unique identifier, and may provide the data, that is generated by different nodes in the supply chain and that is associated with the unique identifier, to the user device.

20 Claims, 9 Drawing Sheets

(56) References Cited

U.S. PATENT DOCUMENTS

2017/0103419 A1    4/2017  Gibson

FOREIGN PATENT DOCUMENTS

| CN | 104823200 A | * | 8/2015 | ............. G06F 21/10 |
| CN | 108961622 A | * | 12/2018 | |
| CN | 113366518 A | * | 9/2021 | ......... G06Q 30/0185 |

* cited by examiner

DYNAMIC PRODUCT LABELS FOR COMPILING CUSTOM DATA FROM SUPPLY CHAIN NODES

CLAIM OF BENEFIT TO RELATED APPLICATIONS

This application is a continuation of U.S. nonprovisional application Ser. No. 16/717,658 entitled "Dynamic Product Labels for Compiling Custom Data From Supply Chain Nodes", filed Dec. 17, 2019, and issued as U.S. Pat. No. 10,977,456. The contents of application Ser. No. 16/717,658 are hereby incorporated by reference.

BACKGROUND

Consumers may obtain information about medicines, supplements, and other products they purchase from the product label and/or packaging. The label and/or packaging may make claims as to the composition, purity, potency, safety, and/or efficacy of the product. Besides these printed claims, there is no reliable, trusted, or easy way for the consumer to verify the claims.

Some products may be tampered with or contaminated at some point in the supply chain before reaching the consumer. Some products may be fraudulently produced by third-parties to resemble the original products, and may be introduced into the supply chain or at the point of sale where they become indistinguishable from the original products. Still other products may be made and/or packaged at different facilities of the same manufacturer. The facilities may use different sourced goods, processes, and/or equipment, any of which can lead to a lack of uniformity or consistency in the end product that is provided to the consumer. The static labels and containers cannot account for any of these variances, and cannot verify that the products were not tampered with, contaminated, or fraudulently produced.

DETAILED DESCRIPTION OF PREFERRED EMBODIMENTS

The following detailed description refers to the accompanying drawings. The same reference numbers in different drawings may identify the same or similar elements.

Disclosed are systems and methods for providing a dynamic label with a product, and for linking data that is generated at different points in the supply chain to the dynamic label so that consumers may access the data to verify the composition, purity, potency, safety, efficacy, and/or other properties of the product at the different points in the supply chain. Based on the data linked to the dynamic label, consumers may further verify that a product was not tampered with, contaminated, fraudulently produced, and/or otherwise manufactured to deviate from claimed standards.

Accordingly, the dynamic product label may provide information that is customized on a per unit basis or per group basis to account for the product path through the supply chain. The dynamic product label may provide different nodes in the supply chain with the ability to dynamically add data to the dynamic label or modify data that is accessible via the dynamic label even after the product has been distributed to consumers. The dynamic product label may be used in conjunction with any product including medicines, supplements, products that are ingested, products with topical applications (e.g., lotions, creams, oils, etc.), cleaning products, products associated with food preparation, and/or other products where a dynamic label is preferred over a static label.

In some embodiments, the dynamic label may include a Near Field Communication ("NFC") tag, Radio-Frequency Identification ("RFID") tag, integrated circuit, or other identifier (e.g., barcode, Quick Response ("QR") code) that can be scanned and/or read using a sensor on a user device. In some embodiments, the dynamic label for a product may be encoded with a machine-readable value that is directly or indirectly linked to the data that is generated for the product by the different supply chain nodes.

Figure 1:
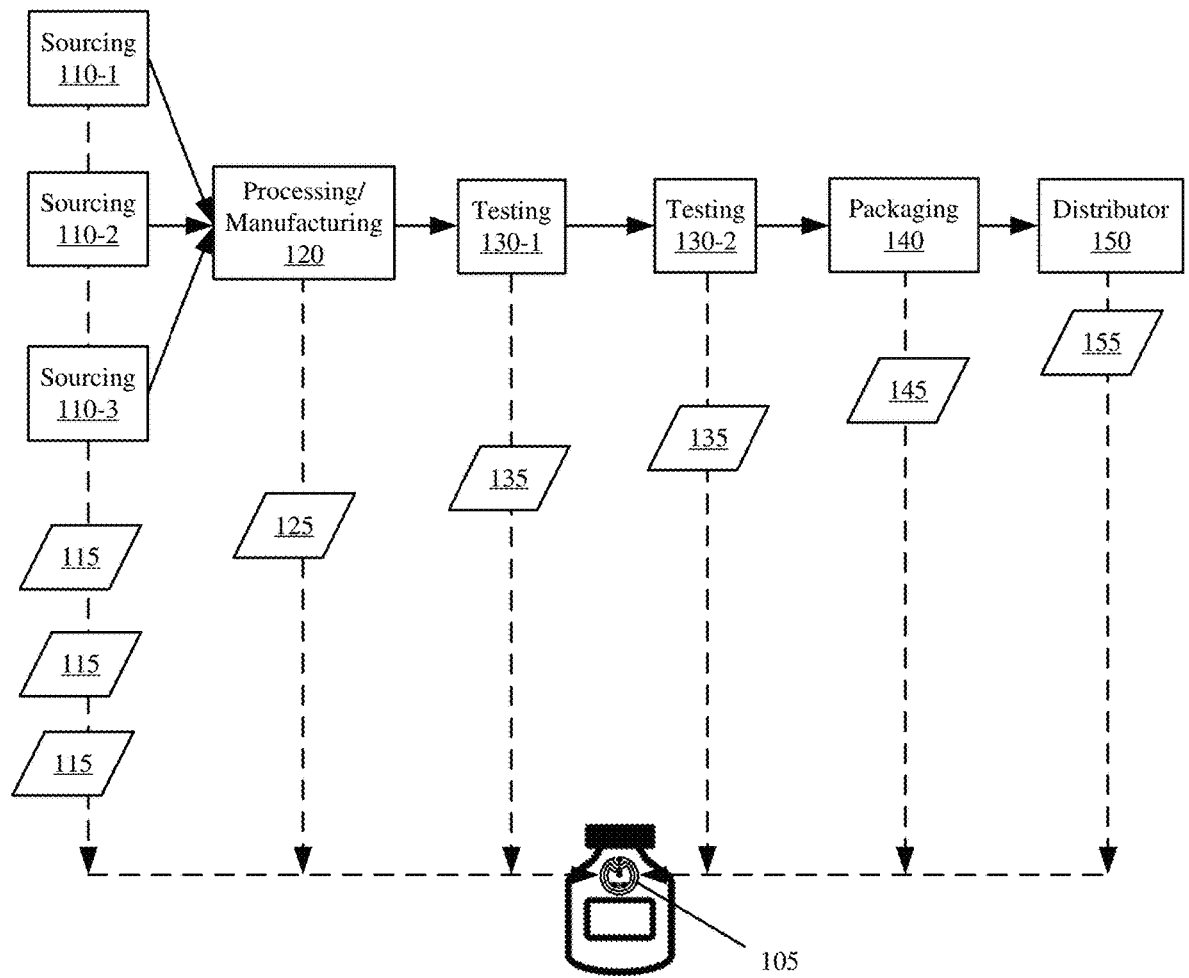
FIG. 1 illustrates an example of linking product data from different points in a supply chain to a dynamic label that is included on the container and/or package of the product in accordance with some embodiments presented herein.

FIG. 1 illustrates an example of linking product data from different nodes 110, 120, 130, 140, and 150 in a supply chain to dynamic label 105 that is included on the container and/or package of the product in accordance with some embodiments presented herein. In preferred embodiments, dynamic label 105 may be or may include an NFC tag. In some other embodiments, dynamic label 105 may include a RFID tag, integrated circuit, or encoded image (e.g., barcode, QR code) that can be scanned via a sensor on a user device.

As shown in FIG. 1, the supply chain may include sourcing nodes 110-1, 110-2, and 110-3 (herein sometimes collectively referred to as "sourcing nodes 110" or individually as "sourcing node 110"), processing/manufacturing node 120, testing nodes 130-1 and 130-2 (herein sometimes collectively referred to as "testing nodes 130" or individually as "testing node 130"), packaging node 140, and distribution node 150. Operations of each node 110-150 may be performed at the same location (e.g., warehouse or facility) or different locations. In some embodiments, nodes 110-150 may represent different entities and/or actors that contribute to the production of the product that is provided to or offered for sale to consumers. In some embodiments, one or more of nodes 110-150 may be controlled by the same or different entities. In some embodiments, the supply chain may include more or less nodes, different nodes, and/or may consolidate or partition the operations performed by the illustrated nodes for sourcing 110, processing/manufacturing 120, testing 130, packaging 140, and distribution 150.

Sourcing nodes 110-1, 110-2, and 110-3 may produce and/or provide the raw materials or ingredients for the product being manufactured. For instance, sourcing nodes 110 may include different farms or suppliers. Each of sourcing nodes 110-1, 110-2, and 110-3 may be responsible for providing the same goods or different goods to processing/manufacturing 120 node.

One or more devices (e.g., sensors, computers, robots, etc.) at sourcing nodes 110 may track and/or capture data set 115 that results from the inputs, outputs, and operations at sourcing nodes 110, and may directly or indirectly associate the data to dynamic label 105. For example, sourcing nodes 110 may generate data set 115 that verifies the point of origin for the goods, the quality of the goods, how the goods were created, and/or other properties. As a specific example, when the product is a supplement containing organic matter that is grown by sourcing nodes 110, sourcing nodes 110 may generate data set 115 to verify that the organic matter was grown without pesticides, antibiotics, hormones, genetic engineering, and/or toxins, and to verify the harvesting date and location of the organic matter.

Processing/manufacturing node 120 may be responsible for producing the product via the goods obtained from sourcing nodes 110. Accordingly, processing/manufacturing node 120 may mix, compile, blend, and/or otherwise combine the goods from sourcing nodes 110 in a manner that yields individual units of the desired product.

One or more devices at processing/manufacturing node 120 may track and/or capture data set 125 that results from the inputs, outputs, and operations at processing/manufacturing node 120, and may directly or indirectly associate the data to dynamic label 105. For example, processing/manufacturing node 120 may generate data set 125 that verifies the composition of the goods used to produce the product or product batch, point of origin (e.g., sourcing nodes 110) for the goods used for producing the product or product batch, the facility at which the product or product batch is produced, the assembly line, equipment, and/or workers that contributed to the manufacturing of the product or product batch, the manufacturing date, conditions (e.g., temperature, humidity, etc.) at the time of manufacturing, and/or other information related to processing and/or manufacturing of the product or product batch.

Testing nodes 130 may include facilities (e.g., laboratories) at which the composition, purity, potency, safety, efficacy, and/or other properties of the manufactured product are tested and measured by a third-party (e.g., an entity other than processing/manufacturing node 120). Testing nodes 130 may also perform tests to verify that the products satisfy compliance, regulatory, and/or other safety standards. Testing nodes 130-1 and 130-2 may perform the same tests to ensure consistency in the results and testing procedures. Testing nodes 130-1 and 130-2 may perform different tests when each node 130 has different equipment or specializes in performing different tests.

Testing nodes 130 may generate test results (e.g., third set of data 135) that can be used verify the composition, purity, potency, safety, efficacy, and/or other properties of the manufactured product. Testing nodes 130 may also generate certifications (e.g., third set of data 135) to indicate that the manufactured product satisfies compliance, regulatory, and/or other safety standards. One or more devices at testing nodes 130 may track and/or capture data set 135 generated at testing nodes 130, and may directly or indirectly associate data set 135 to dynamic label 105.

Packaging node 140 may represent one or more facilities at which the manufactured products are packaged and/or labeled. In some embodiments, manufacturing/processing node 120 may be at the same location as packaging node 140. In some other embodiments, the individual products that are produced by manufacturing/processing node 120 may be shipped to packaging node 140 where the products are placed in containers and/or boxes bearing dynamic label 105, and/or where the containers and/or boxes are placed in palettes for shipment to vendors.

Packaging node 140 may generate data set 145 that verifies the handling of the product (e.g., operations to prevent tampering), the contents of the containers and/or boxes (e.g., prevent fraudulent products by identifying manufacturing/processing node 120 as the provider of the manufactured product), and/or the cleanliness of the facility at which the packaging is performed (e.g., operations to prevent contamination). Other packaging data (e.g., data set 145) may include the packaging date, conditions at the packaging facility, and/or identification of the assembly line, equipment, and/or workers that packaged the products. One or more devices at packaging node 140 may track and/or capture data set 145 generated at packaging node 140, and may directly or indirectly associate data set 145 to dynamic label 105.

In some embodiments, packaging node 140 is also the point in the supply chain at which dynamic label 105 is associated with the manufactured products. For instance, packaging node 140 may add dynamic label 105 to the product container or package, may scan dynamic label 105, may package a set of products in the container or box, and may link the data sets that are generated at packaging node 140 and other nodes in the supply chain (e.g., sourcing nodes 110, processing/manufacturing node 120, and testing nodes 130) to dynamic label 105. The linking of the data sets to dynamic label 105 is explained in greater detail below. In some embodiments, the same dynamic label 105 may be used on containers or packages of different products when the products are part of a common batch that was produced by the same nodes in the supply chain and/or at the same time.

Distribution node 150 may ship or move the packaged product from packaging node 140 to wholesalers or retailers that then make the product available to consumers. Distribution node 150 may generate data set 155 that verifies which products are shipped to which locations, the handling of the products, and/or operations to prevent tampering, contamination, spoilage, and/or damage to the product during transport. One or more devices at distribution node 150 may track and/or capture data set 155 generated at distribution node 150 or as the products are in transit, and may directly or indirectly associate data set 155 to dynamic label 105.

Figure 2:
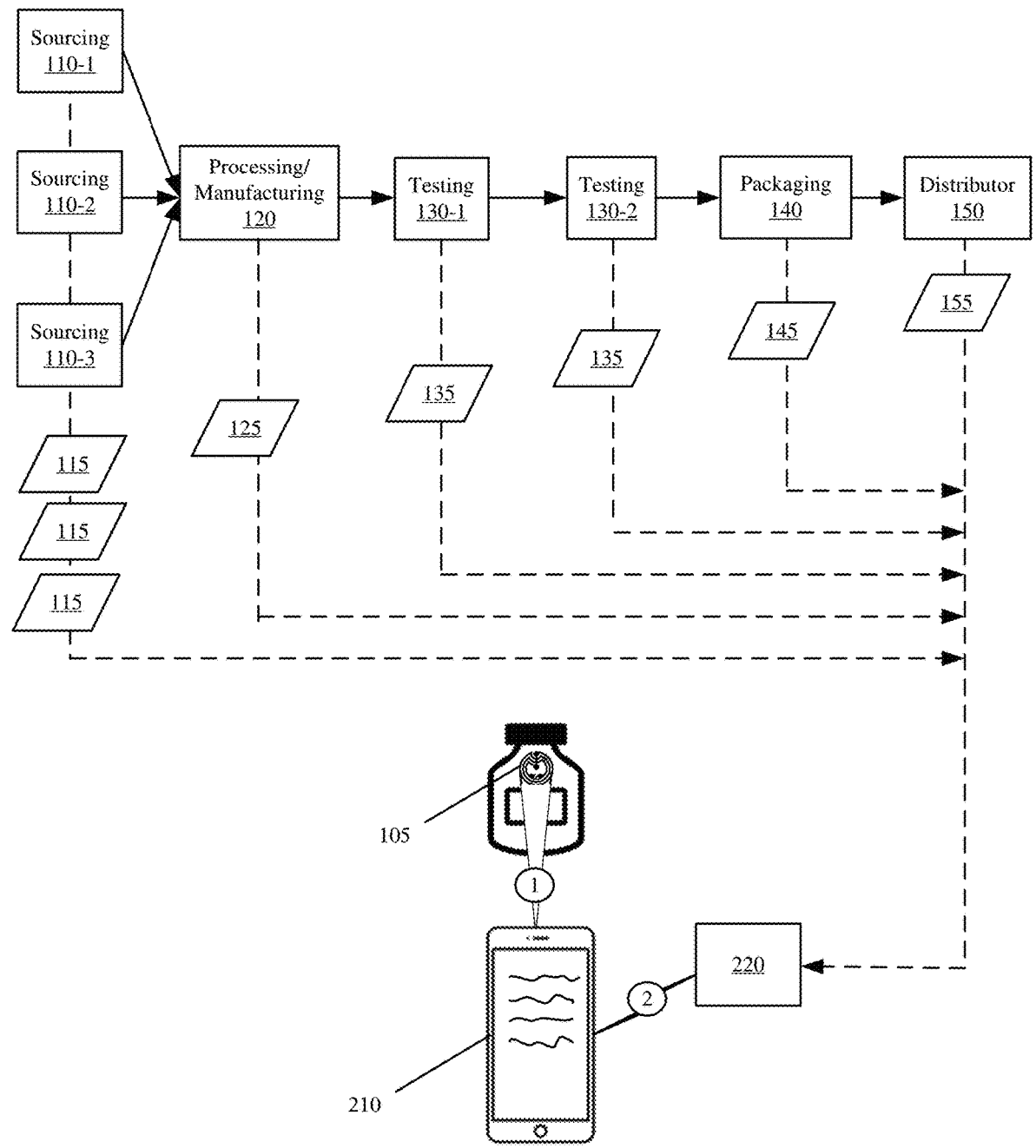
FIG. 2 illustrates an example of using the dynamic product label to access data from different points in the supply chain in accordance with some embodiments presented herein.

FIG. 2 illustrates an example of using dynamic label 105 of a product to access data for that product from one or more data sets 115, 125, 135, 145, and 155 generated by different nodes 110-150 in the supply chain in accordance with some embodiments presented herein. User device 210 may scan (at 1) dynamic label 105 from the product container and/or package. In some embodiments, user device 210 may use an embedded NFC chip to read a value from dynamic label 105 via magnetic inductance. In some other embodiments, user device 210 may use an integrated circuit, radio, camera, or other sensor to read and/or decode the value from dynamic label 105

User device 210 may access (at 2) host 220 using the value that is read from dynamic label 105. In some embodiments, host 220 may be a network-accessible device that provides a website, network-accessible interface, and/or Application Programming Interface ("API") from which product data generated by the supply chain nodes 110-150 can be accessed. In some embodiments, the value read from dynamic label 105 corresponds to a Uniform Resource Locator ("URL") with the product data. In some embodiments, the value read from dynamic label 105 may be used as a query parameter for querying host 220 for the product data. In any case, host may provide user device 210 with data for the product from one or more data sets 115, 125, 135, 145, and 155. User device 210 may use a wired or wireless network (e.g., WiFi, Long Term Evolution ("LTE") connectivity, Fifth Generation New Radio ("5G NR"), etc.) to access (at 2) host 220.

Figure 3:
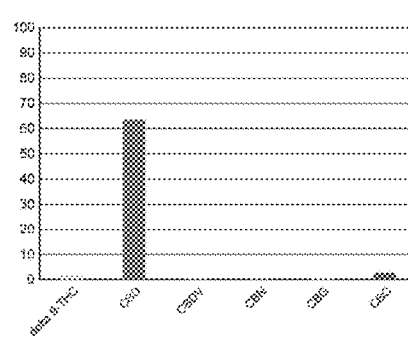
FIG. 3 illustrates examples of two custom data sets that may be accessed using the dynamic product labeling in accordance with some embodiments presented herein.
Figure 3:
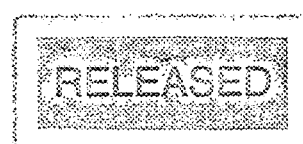

FIG. 3 illustrates examples of two custom data sets 310 and 320 that may be accessed from host 220 using dynamic label 105 in accordance with some embodiments presented herein. Specifically, data sets 310 and 320 may be accessed in response to user device 210 scanning dynamic label 105 from a product container or package, and requesting a website that is targeted by a value that is read from dynamic label 105 by user device 210.

First data set 310 may be generated by one or more of processing/manufacturing node 120 and testing nodes 130, and may present the chemical composition of the product. A user may reference first data set 310 to verify the composition, purity, potency, safety, efficacy, and/or other properties of the product.

Second data set 320 may be generated by a different node in the product supply chain than the node that generated first data set 310. For instance, second data set 320 may be generated by packaging node 140. Second data set 320 may present information about who, where, and how the product was packaged. The user may reference second data set 320 to verify that the product was not tampered with, contaminated, or otherwise varies from compliance and/or consistency standards.

Figure 4:
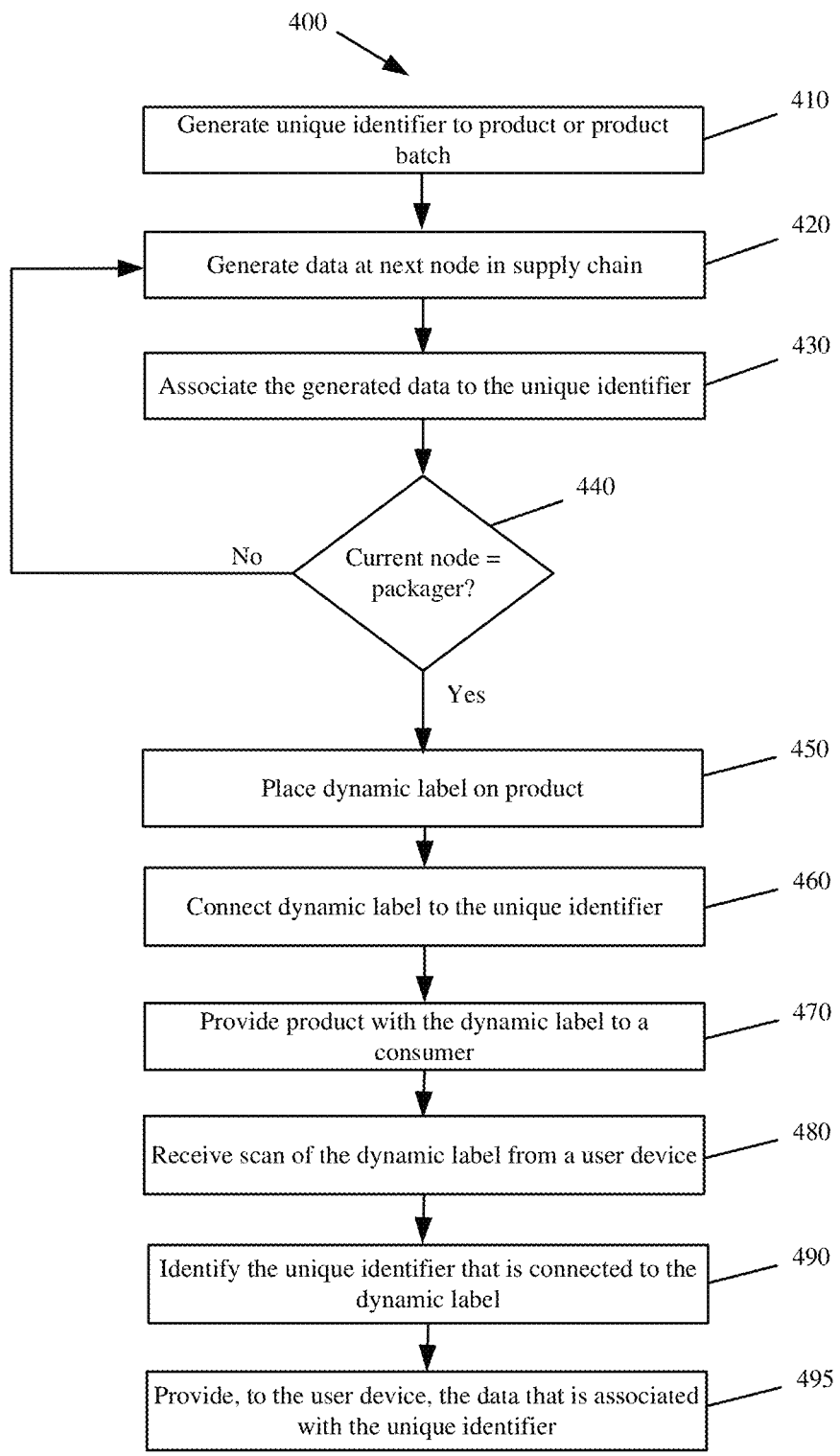
FIG. 4 presents a process for linking data from different nodes in the supply chain to the dynamic product label that a consumer may use to subsequently access the linked data in accordance with some embodiments presented herein.

FIG. 4 presents a process 400 for linking data from different nodes in the supply chain to dynamic label 105, and for providing a consumer access to the linked data via dynamic label 105 in accordance with some embodiments presented herein. Process 400 may include generating (at 410) a unique identifier for a new product or product batch. In some embodiments, the first node (e.g., sourcing nodes 110) or another node in the supply chain may generate (at 410) the unique identifier, and may provide the unique identifier to the other nodes in the supply chain path involved in the production of the same product. The unique identifier may include an alphanumeric character sequence to be used in identifying the product data that is generated at each node involved in the production of the product.

Process 400 may include generating (at 420) data for the product at a next node in the supply chain. For instance, sourcing 110 may be the first node in the supply chain, and may generate (at 420) first data set 115 for the product. As noted above, sourcing 110 may provide the raw materials that are used by processing/manufacturing node 120 to manufacture the product. Accordingly, sourcing nodes 110 may generate (at 420) data that provides information about the raw materials.

Process 400 may include associating (at 430) the generated data to the unique identifier. Associating (at 430) the generated data to the unique identifier may include linking, tagging, or storing the data with the unique identifier. For instance, sourcing node 110 may associate (at 430) data about the raw materials used in the product with the unique identifier, whereas processing/manufacturing node 120 may associate (at 430) different data about manufacturing the product from the raw materials to the unique identifier. Each supply chain node may have storage for storing the data that is generated (at 420) by that node along with the unique identifier. Alternatively, each supply chain node may upload the data generated (at 420) by that node along with the unique identifier to a common repository. In some embodiments, the supply chain node generating (at 420) the data may receive the unique identifier from a node that is earlier in the supply chain. In other words, one node may generate data, associate the data to the unique identifier, then pass the unique identifier along with the product at some production stage to a next node so that the next node can generate and associate additional product data to the same unique identifier as the product evolves through the supply chain.

Process 400 may include determining (at 440) if the current node in the supply chain (e.g., the current node generating data and associating data to the unique identifier) corresponds to a particular supply chain node at which dynamic label 105 is added to or associated with the product. In some embodiments, dynamic label 105 is added to a container or package of the product by packaging node 140.

In response to determining (at 440—No) that dynamic label 105 is not added at the current node, process 400 may include moving to the next node in the supply chain where additional data may be generated (at 420) and associated (at 430) with the unique identifier. In particular, process 400 may resume with the generation (at 420) of a new data set once the product at its current unfinished state (and the unique identifier for the product) is provided to a next node in the supply chain.

In response to determining (at 440—Yes) that the current node is where dynamic label 105 is added to or otherwise associated with the product, process 400 may link the generated data to dynamic label 105. Linking the generated data to dynamic label 105 may include placing (at 450) dynamic label 105 on the product, product container, or product package. In some embodiments, dynamic label 105 may include a printed label and/or sticker with an integrated NFC tag. In some embodiments, dynamic label 105 may include an NFC tag that is attached to the product container or package independent of other labels and/or stickers. Placing (at 450) dynamic label 105 may include sticking the NFC tag to the product container or package with an adhesive or integrating the NFC tag directly into the product container or package. In some embodiments, each unit of a product may receive a different dynamic label. In some other embodiments, all products in a particular may receive the same dynamic label.

Linking the generated data to dynamic label 105 may further include connecting (at 460) dynamic label 105, that is placed (at 450) on the product container or package, to the unique identifier that is associated (at 430) with the data generated (at 420) by different supply chain nodes. In some embodiments, connecting (at 460) dynamic label 105 to the unique identifier may include identifying a value of dynamic label 105 by scanning dynamic label 105 or by programming dynamic label 105 with the value. Connecting (at 460) dynamic label 105 to the unique identifier may further include linking the value of dynamic label 105 to the unique identifier such that the product data that is associated (at 430) with the unique identifier also becomes associated with the value of dynamic label 105 and/or becomes accessible using the value of dynamic label 105.

Process 400 may include providing (at 470) the product with dynamic label 105 to a consumer. The product may be shipped to retailers where consumers may purchase or otherwise acquire the product.

Process 400 may include receiving (at 480) a scan of dynamic label 105 from user device 210. For instance, the NFC chip of user device 210 may read the value from dynamic label 105, and may wirelessly provide the value to host 220 where the data linked to dynamic label 105 can be accessed. As noted above, the value from dynamic label 105 may specify a URL, address, or other identifier for reaching host 220, and for directly or indirectly (e.g., via the link established between the value of dynamic label 105 and the unique identifier for the product) identifying the product data that is linked to dynamic label 105.

Process 400 may include identifying (at 490) the unique identifier that is connected to received value from dynamic label 105. In some embodiments, the identification (at 490) may include performing a database query or other lookup using the value that is read from dynamic label 105 in order to determine the unique identifier that is connected to the value of dynamic label 105.

Process 400 may then include providing (at 495), to user device 210, the product data that is associated (at 430) with the unique identifier by different nodes in the supply chain. In some embodiments, the product data may be wirelessly transmitted to user device 210 over a data network. In some embodiments, the data is presented on user device 210 in a graphical user interface or application.

Figure 5:
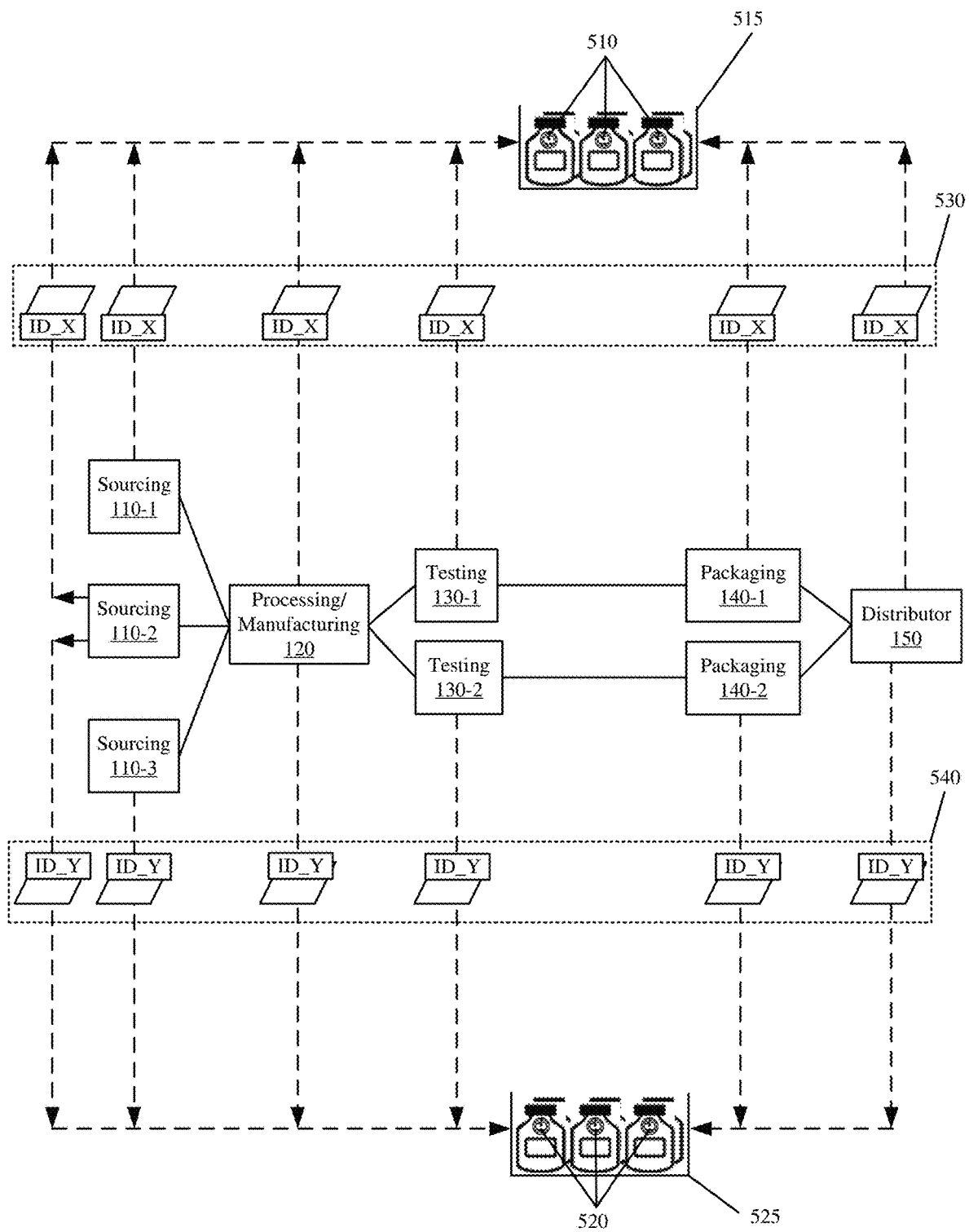
FIG. 5 illustrates an example of different data being associated with the dynamic labels of the same product produced by different supply chain nodes in accordance with some embodiments presented herein.

FIG. 5 illustrates an example of different data being associated with dynamic labels 510 and 520 of the same product produced by different supply chain nodes in accordance with some embodiments presented herein. As shown in FIG. 5, production of first product batch 515 begins by obtaining ingredients, raw materials, or other source items from sourcing node 110-1 and 110-2, whereas production of second product batch 525 begins by obtaining ingredients, raw materials, or other source items from sourcing nodes 110-2 and 110-3.

In some embodiments, sourcing nodes 110-1 and 110-3 may provide the same source items for first product batch 515 and second product batch 525, but may grow, manufacture, or otherwise provide the source items from different locations with different equipment, workers, conditions, nutrients, chemicals, and/or other variances in how the source items are produced or obtained. In some other embodiments, sourcing nodes 110-1 and 110-3 may provide different source items for different compositions, potencies, and/or other variances in first product batch 515 and second product batch 525.

In any case, sourcing nodes 110-1, 110-2, and 110-3 may generate different data sets 530 and 540. Data set 530 may include product data from sourcing nodes 110-1 and 110-2, and may be associated with a first unique identifier (e.g., "ID X"). The first unique identifier may be used by the supply chain nodes to tag product data that is generated for first product batch 515. Data set 540 may include product data from sourcing nodes 110-2 and 110-3, and may be associated with a second unique identifier (e.g., "ID_Y"). The second unique identifier may be used by the supply chain nodes to tag product data that is generated for second product batch 525.

First product batch 515 may be manufactured at processing/manufacturing node 120 using the materials obtained from sourcing nodes 110-1 and 110-2, and second product batch 525 may be also be manufactured at processing/manufacturing node 120 using different materials obtained from sourcing nodes 110-2 and 110-3. Accordingly, even though product batches 515 and 525 are manufactured at the same facility using the same equipment and/or workers, different data may again be generated for each product batch 515 and 525 at processing/manufacturing node 120 because of the different materials from different sourcing nodes 110 used in the manufacturing process. For instance, products of first product batch 515 and second product batch 525 may have slight variances due to the different sourced materials, and the slight variances may be indicated in data sets 530 and 540 by the data that is generated for each product batch 515 and 525 by processing/manufacturing node 120. In other words, processing/manufacturing node 120 may generate first data as a result of manufacturing first product batch 515, and may associate the first data to the first unique identifier used in identifying first product batch 515. Similarly, processing/manufacturing node 120 may generate second data as a result of manufacturing second product batch 525, and may associate the second data to the second unique identifier used in identifying second product batch 525.

First product batch 515 may be tested by testing node 130-1 at a first facility, and second product batch 525 may be tested by testing node 130-2 at a second facility. The test results from testing node 130-1 may be associated with first product batch 515 by linking the test results to the first unique identifier, and the test results from testing node 130-2 may be associated with second product batch 525 by linking the test results to the second unique identifier. Even though the test results may be the same and/or indicate compliance, regulatory, and/or safety standards being met, the different data sets allow consumers of each product batch 515 and 525 to identify where, how, and/or when each batch 515 and 525 was tested.

First product batch 515 may be packaged at first packaging node 140-1 where first dynamic label 510 may be placed on the container and/or package of each product in first product batch 515. First packaging node 140-1 may associate additional data that is generated during the packaging process of first product batch 515 to the first unique identifier, and may connect the first unique identifier to first dynamic label 510 so that all data that has been associated with the first unique identifier throughout the supply chain becomes accessible via first dynamic label 510. In some embodiments, first packaging node 140-1 may program the NFC tag of first dynamic label 510 with a URL that points to a site where the data associated with first unique identifier is accessible. In some embodiments, the NFC tag of first dynamic label 510 may be programmed with the first unique identifier, and user device 210 may read and transmit the first unique identifier to host 220 where the data associated with the first unique identifier is provided. In some embodiments, the NFC tag of first dynamic label 510 may already be encoded with a value, and first packaging node 140-1 may read the value from the NFC tag and link the value from the NFC tag to the first unique identifier. Accordingly, when user device 210 queries host 220 with the value from the NFC tag, host 220 can identify the link between the value and the first unique identify, and may provide the data that is associated with the first unique identifier in response to the query.

Similarly, second product batch 525 may be packaged at second packaging node 140-2 where second dynamic label 520 may be placed on the container and/or package of each product in second product batch 525. Second packaging node 140-2 may associate data that is generated during the packaging process of second product batch 525 to the second unique identifier, and may connect the second unique identifier to second dynamic label 520 so that all data that has been associated with the second unique identifier throughout the supply chain becomes accessible via second dynamic label 520.

Additional data may be generated and associated with the first unique identifier of first product batch 515 and with the second unique identifier of second product batch 525 at distribution node 150. The generated data can be added to the unique identifier even after dynamic labels 510 and 520 have been connected to the unique identifiers used in the supply chain to associate data to the respective products or product batches 515 and 525.

FIG. 5 therefore illustrates an example of different data being dynamically added to dynamic product labels 510 and 520 for different units or batches of the same product. Accordingly, user device 210 may receive different data when scanning dynamic product label 510 and 520 from different units or batches of the same product. The different data provides the user with more accurate verification of the product lifecycle throughout the supply chain while also verifying composition, purity, potency, safety, and/or efficacy of the product in a manner that is more accurate than what is printed on a static label, wherein the static label provides the same data for all units or batches of the product even when variances may exist in the different units or batches.

Another benefit of dynamic product labels 510 and 520 is the ability for any node in the supply chain to modify or update the data it generated for a product even after the product has left that node in the supply chain and/or has shipped to consumers. The dynamic updating of the data that is accessed from dynamic product labels 510 and 520 can be used to notify consumers of important safety information and/or disclose new information. For instance, some time after first product batch 515 is shipped to consumers, sourcing node 110-1 may determine that the materials it provided for the manufacturing of first product batch 515 were contaminated, and may therefore update the data that is accessed via first dynamic label 510 to notify consumers of the issue while the data for dynamic product label 520 for second product batch 525 may be left unchanged.

Figure 6:
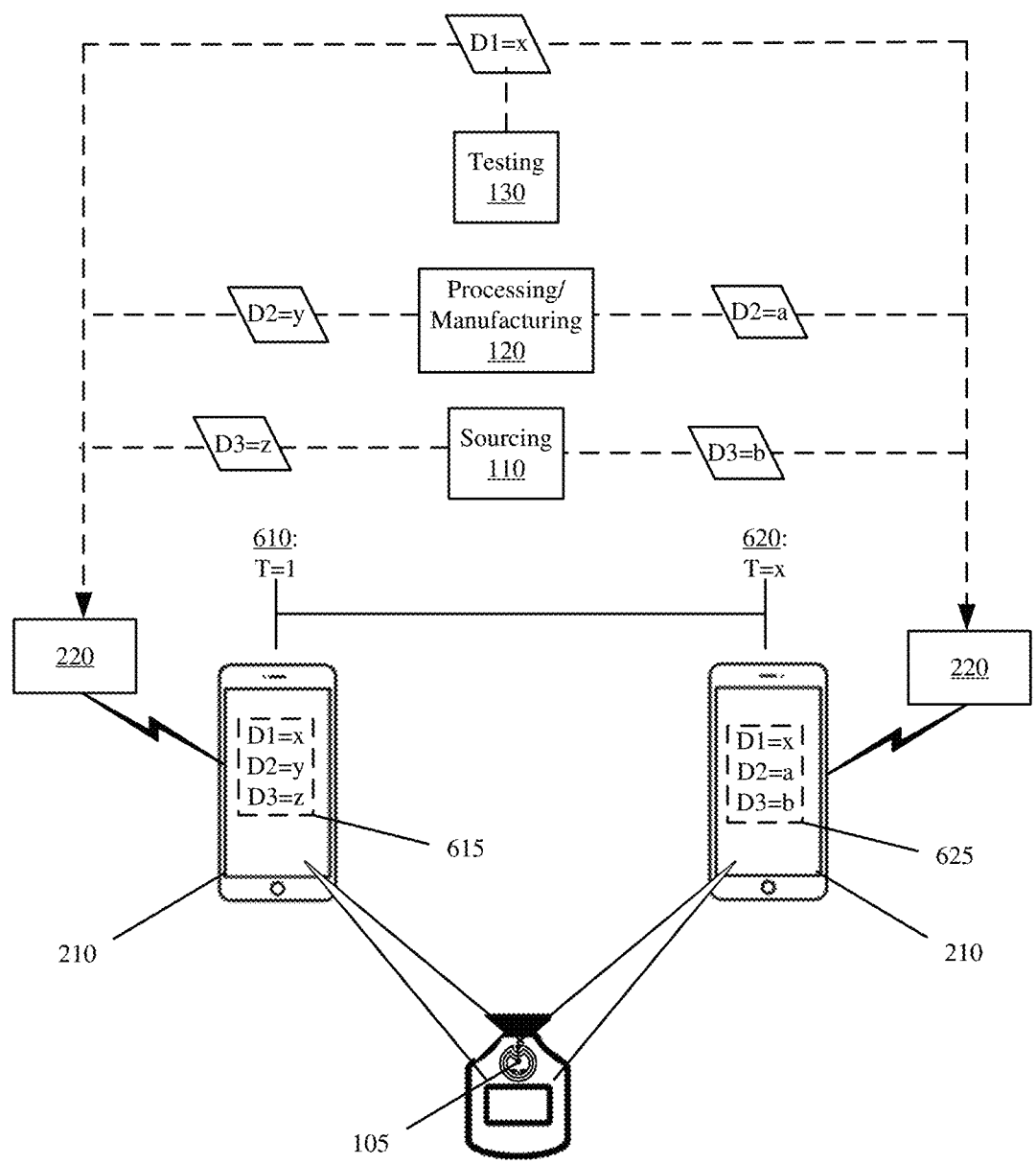
FIG. 6 illustrates an example of dynamically updating data for a product using the dynamic product label in accordance with some embodiments presented herein.

FIG. 6 illustrates an example of dynamically updating data for a product and conveying the updated data via dynamic product label 105 in accordance with some embodiments presented herein. At first time 610, user device 210 may read the NFC tag or other identifier from dynamic product label 105 of a product. User device 210 may obtain a value from reading the dynamic product label 105, and may pass the value to host 220. Host 220 may return first data set 615 that is associated with dynamic product label 105 (e.g., data that is associated with the unique identifier assigned to the product and that is connected to the value from dynamic product label 105), and that is generated by sourcing node 110, processing/manufacturing node 120, and testing node 130 by first time 610.

Between first time 610 and later second time 620, sourcing node 110 and processing/manufacturing node 120 may change the data that was contributed to first data set 615. For instance, sourcing node 110 may receive additional certification for its materials (e.g., certified vegan) that can be added to the data for the product. Processing/manufacturing node 120 may add a new regulatory statement to the product as a result of newly passed legislation. In each case, the new data can be associated with the unique identifier of the product that is connected to dynamic product label 105 placed on the product container or packaging. Accordingly, when user device 210 scans dynamic product label 105 at second time 620, and provides the value extracted from dynamic product label 105 to host 220, host 220 may return different second data set 625 to user device 210 at second time 620, and user device 210 may present the updated information.

Figure 7:
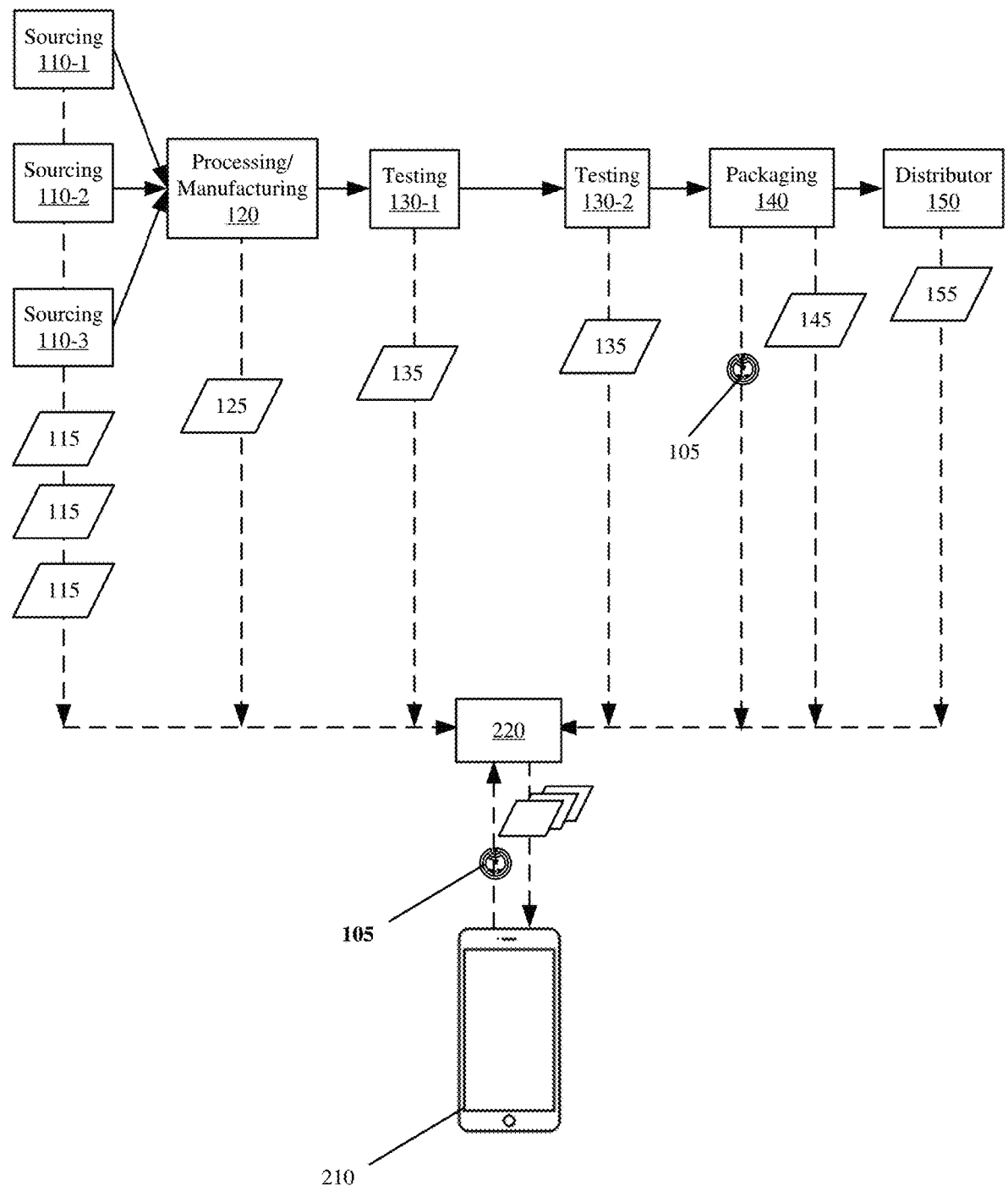
FIG. 7 illustrates an example architecture for the dynamic product labeling of some embodiments.

FIG. 7 illustrates an example architecture for the dynamic product labeling of some embodiments. Supply chain nodes 110-150 may provide generated product data to host 220. More specifically, supply chain nodes 110-150 may provide the data that they generate for a product along with the unique identifier that is assigned to the product to host 220.

Host 220 may include one or more devices with storage and network connectivity. Host 220 may be accessed via an Internet Protocol ("IP") address, URL, and/or other identifiers. Host 220 may aggregate the data that is generated by different nodes 110-150 for different product unique identifiers, wherein each unique identifier may be associated with the data of a different product, product batch, or other sets of products. In some embodiments, host 220 may generate and distribute the unique identifiers to supply chain nodes 110-150.

Host 220 may also receive dynamic product label 105 and/or the value of dynamic product label 105 that is used to access the data associated with a unique identifier. In some embodiments, packaging node 140 may connect dynamic product label 105 to a unique identifier, and may identify the link between dynamic product label 105 and the unique identifier to host 220.

Host 220 may provide an interface with which user device 210 may access the product data. In some embodiments, user device 210 may issue HyperText Transfer Protocol ("HTTP") messages to host 220 in order to request specific product data. In particular, user device 210 may read a value from the NFC tag and/or other identifier of dynamic label 105 on the container, package, or elsewhere on the product, and may submit the value to host 220. Host 220 may identify the unique identifier that is connected and/or linked with the value extracted from dynamic product label 105, may retrieve the data that is associated with the unique identifier, and may provide the retrieved data to user device 210 via one or more data packets.

Figure 8:
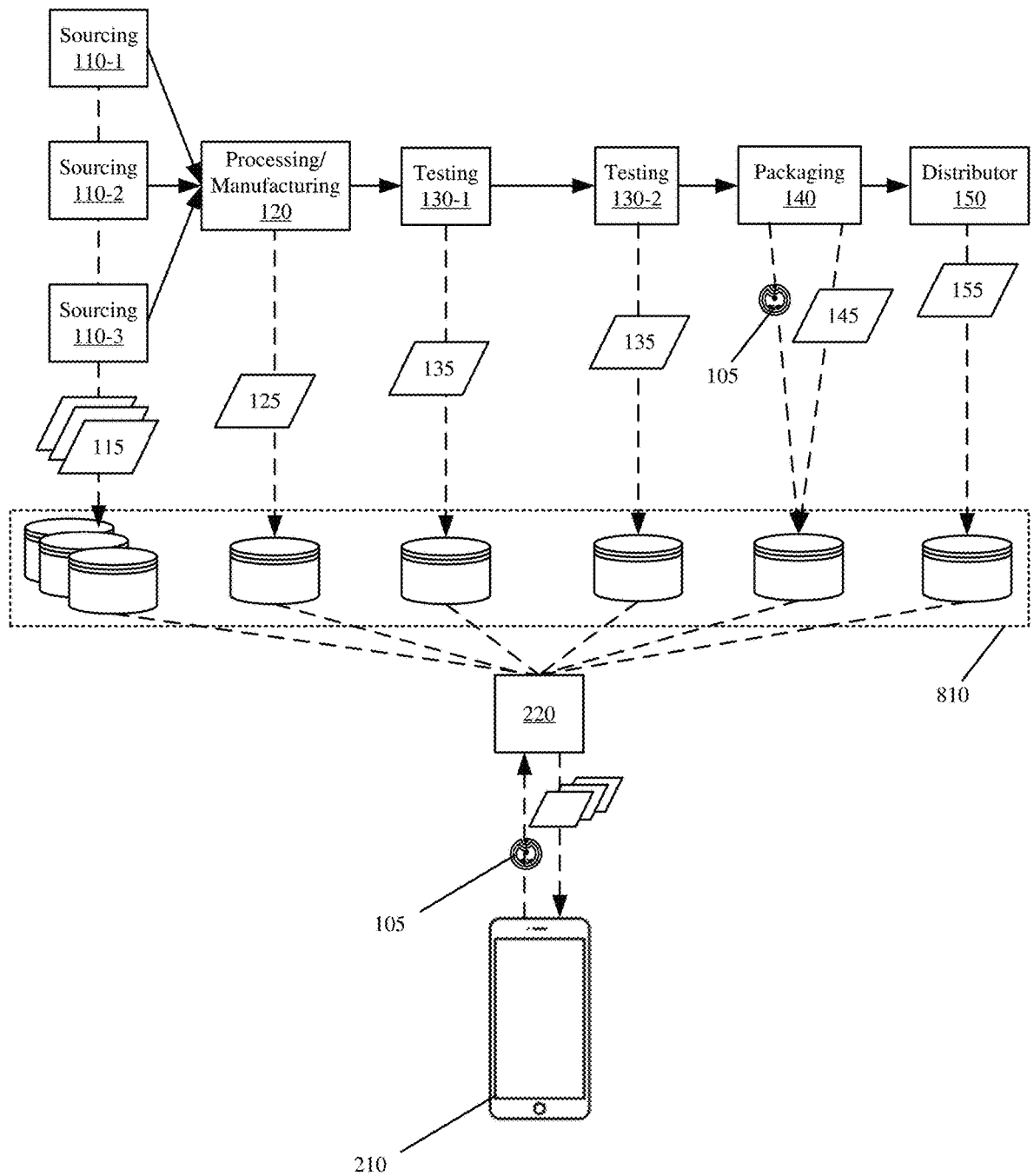
FIG. 8 illustrates an alternative architecture for the dynamic product labeling of some embodiments.

FIG. 8 illustrates an alternative architecture for the dynamic product labeling of some embodiments. As shown in FIG. 8, supply chain nodes 110-150 may include one or more storage devices 810 for storing the data that is generated by that node and the unique identifier associated with the data. Host 220 may compile the product data from storage devices 810, and may return the compiled data to user device 210 in response to a request for the product data from user device 210.

To do so, host 220 may store a mapping of dynamic product label 105 to the corresponding product unique identifier. Upon receiving a request with the value extracted from dynamic product label 105, host 220 may determine the unique identifier that is linked to that dynamic product label 105 value. Host 220 may then retrieve the data that is associated with the unique identifier from storage devices 810, and may return the retrieved data to user device 210. In this alternative architecture, host 220 may serve as an interface from which product data may be accessed despite disparate storage of the data at storage devices 810.

Figure 9:
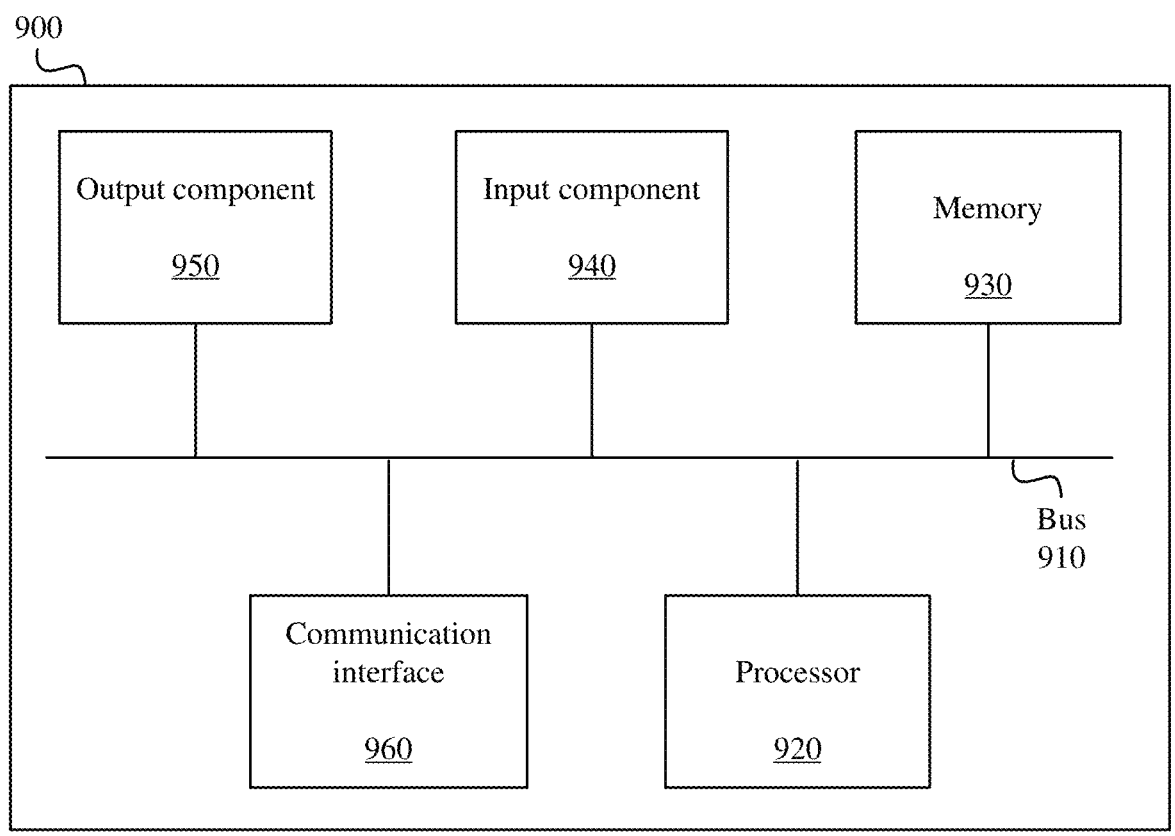
FIG. 9 illustrates example functional components of one or more devices, in accordance with one or more embodiments described herein.

FIG. 9 is a diagram of example components of device 900. Device 900 may be used to implement one or more of the devices or systems described above (e.g., user device 210, host 220, sourcing nodes 110, processing/manufacturing node 120, testing nodes 130, packaging node 140, distribution node 150, etc.). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The ten "greater than" (or similar ter s), as used hereinto describe a relationship of a value to a threshold, may be used interchangeably with the term "greater than or equal to" (or similar terms). Similarly, the term "less than" (or similar terms) as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    labeling a product or a packaging of the product with a dynamic label, wherein the dynamic label is integrated with one or more of a Radio-Frequency Identification ("RFID") tag, Near Field Communication ("NFC") tag, or an integrated circuit;
    linking data, that is produced by one or more nodes in a supply chain of the product, to the dynamic label, wherein said linking the data comprises:
        associating first data to the dynamic label based on a particular node of the one or more nodes in the supply chain providing the first data at a first time for the product; and
        replacing the first data with second data based on the particular node providing the second data at a later second time for the product; and
    transmitting the data from a host to a device in response to the device scanning the dynamic label.

2. The method of claim 1, wherein transmitting the data comprises:
    providing the first data in response to the device scanning the dynamic label between the first time and the second time; and
    providing the second data in response to the device scanning the dynamic label after the second time.

3. The method of claim 1, wherein transmitting the data comprises:
    providing data that is supplied by a first node of the one or more nodes in the supply chain, and different data that is supplied by a different second node of the one or more nodes in the supply chain, wherein the first node is at a different physical location than the second node.

4. The method of claim 1 further comprising:
    encoding the dynamic label with a unique machine-readable value that is linked to the data and that is different than a machine-readable value of another dynamic label placed on a different unit or packaging of the product.

5. The method of claim 4, wherein the unique machine-readable value comprises a Uniform Resource Locator ("URL") from which to access the data.

6. The method of claim 1 further comprising:
    modifying the data that is linked to the dynamic label after labeling the product or the packaging of the product with the dynamic label.

7. The method of claim 1 further comprising:
    customizing the data that is linked to the dynamic label of different units of the product based on differences in sourced goods used in producing the different units of the product.

8. The method of claim 1 further comprising:
    customizing the data that is linked to the dynamic label of different units of the product based on different results that are generated from testing the different units of the product before distributing the different units of the product for sale.

9. The method of claim 1 further comprising:
    customizing the data that is linked to the dynamic label of different units of the product based on differences in locations, facilities, equipment, or workers involved in producing the different units of the product.

10. The method of claim 1 further comprising:
    customizing the data that is linked to the dynamic label of different units of the product based on different dates associated with each of the different units of the product, wherein the different dates comprise one or more of a potency date, expiration date, manufacturing date, harvest date, and distribution date.

11. The method of claim 1, wherein the data comprises a certification for one or more of compliance, regulatory, and safety standards.

12. The method of claim 1, wherein labeling the product comprises:
    determining a unique identifier with which to access the data that is produced by the one or more nodes in the supply chain; and
    connecting a machine-readable value of the dynamic label to the unique identifier.

13. The method of claim 12, wherein connecting the machine-readable value comprises:
    programming the machine-readable value of the dynamic label with the unique identifier.

14. The method of claim 12,
    wherein connecting the machine-readable value comprises establishing a link between a first unique value from the machine-readable value of the dynamic label and a second unique value of the unique identifier; and
    wherein transmitting the data from the host comprises:
        receiving the first unique value from the device; and
        retrieving the data using the second unique value in response to the link between first unique value and the second unique value.

15. A dynamic labeling system comprising:
    a dynamic label affixed to a product or a packaging of the product, wherein the dynamic label is integrated with one or more of a Radio-Frequency Identification ("RFID") tag, Near Field Communication ("NFC") tag, or an integrated circuit; and
    a host comprising one or more processors configured to:
        link data, that is produced by one or more nodes in a supply chain of the product, to the dynamic label, wherein said linking the data comprises:
            associating first data to the dynamic label based on a particular node of the one or more nodes in the supply chain providing the first data at a first time for the product; and
            replacing the first data with second data based on the particular node providing the second data at a later second time for the product; and
        transmit the data from the host to a device in response to the device scanning the dynamic label.

16. The dynamic labeling system of claim 15, wherein the one or more processors are further configured to:
    customize the data that is linked to the dynamic label of different units of the product based on differences in sourced goods used in producing the different units of the product.

17. The dynamic labeling system of claim 15, wherein the one or more processors are further configured to:
    customize the data that is linked to the dynamic label of different units of the product based on different results that are generated from testing the different units of the product before distributing the different units of the product for sale.

18. The dynamic labeling system of claim 15, wherein the one or more processors are further configured to:
    customize the data that is linked to the dynamic label of different units of the product based on differences in locations, facilities, equipment, or workers involved in producing the different units of the product.

19. The dynamic labeling system of claim 15, wherein the one or more processors are further configured to:

customize the data that is linked to the dynamic label of different units of the product based on different dates associated with each of the different units of the product, wherein the different dates comprise one or more of a potency date, expiration date, manufacturing date, harvest date, and distribution date.

20. A method comprising:

labeling a product or a packaging of the product with a dynamic label, wherein the dynamic label is integrated with one or more of a Radio-Frequency Identification ("RFID") tag, Near Field Communication ("NFC") tag, or an integrated circuit that encodes a machine-readable value;

linking data, that is produced by one or more nodes in a supply chain of the product, to the dynamic label; and determining a unique identifier with which to access the data that is produced by the one or more nodes in the supply chain;

establishing a link between a first unique value from the machine-readable value of the dynamic label and a second unique value of the unique identifier;

transmitting the data from a host to a device in response to the device scanning the dynamic label, wherein transmitting the data from the host comprises:
  receiving the first unique value from the device; and
  retrieving the data using the second unique value in response to the link established between first unique value and the second unique value.

* * * * *